April 13, 1954 — E. M. SPLAINE — 2,674,910
TOOL FOR EXPANDING THE THREADED END OF SCREWS USED ON OPHTHALMIC MOUNTINGS
Original Filed Nov. 23, 1949 — 2 Sheets-Sheet 1
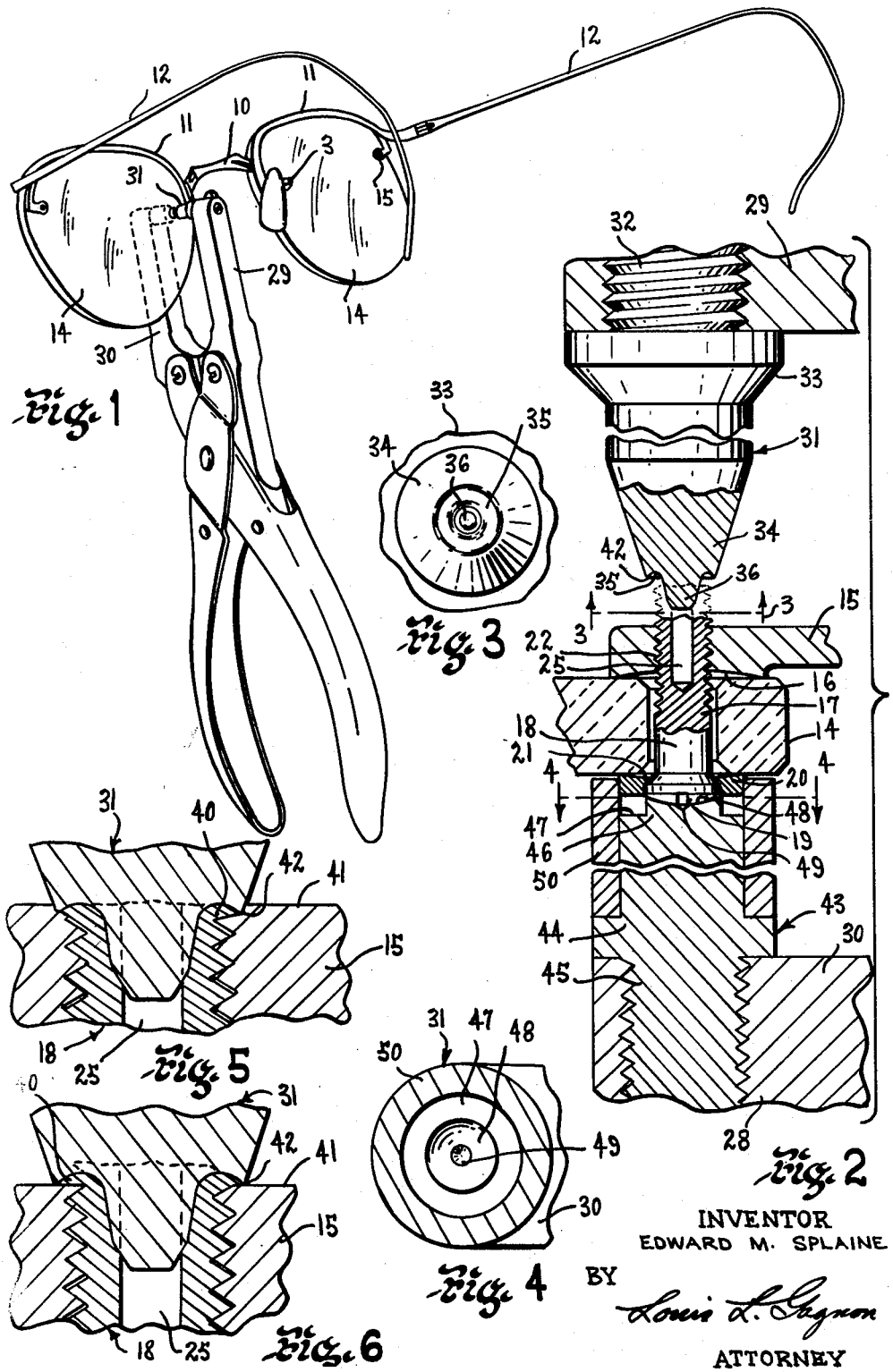
INVENTOR
EDWARD M. SPLAINE
BY
Louis L. Gagnon
ATTORNEY Patented Apr. 13, 1954

2,674,910

UNITED STATES PATENT OFFICE 2,674,910

TOOL FOR EXPANDING THE THREADED END OF SCREWS USED ON OPHTHALMIC MOUNTINGS

Edward M. Splaine, Southbridge, Mass., assignor to American Optical Company, Southbridge, Mass., a voluntary association of Massachusetts Original application November 23, 1949, Serial No. 128,983. Divided and this application October 19, 1951, Serial No. 252,051

6 Claims. (Cl. 81—3.6)

This invention relates to improvements in ophthalmic mountings and has particular reference to an improved device for use in attaching lens straps to the lenses of rimless type mountings.

The instant application is a division of my earlier filed application, Serial Number 128,983, filed November 23, 1949 (now abandoned).

One of the principal objects of the invention, as set forth in the present application, is to provide in an arrangement and method of forming ophthalmic mountings of the type embodying lens straps and connection screws for securing the straps to the lenses, novel means for anchoring the screws, after the parts are assembled, so as to obviate their tendency to back out and loosen during use, and with the extent of said anchoring being controlled so as to permit the screws to be manually loosened and removed for interchanging or replacing lenses if desired.

Another object is to provide a device which will not only set the screws in mountings of the above nature but which will simultaneously smoothen out surface irregularities which might exist on the ends of the screws when the screws are cut to remove excess length after the parts are assembled and subsequent to the setting operation.

Another object is to provide a device of the above character wherein the extent of setting of the screw is controlled independently of the force applied during the setting operation.

Another object is to provide a device of the above character for setting the screws of lens strap connections with the lenses of a rimless type ophthalmic mounting whereby no strain will be directed to the lenses during the setting operation.

Other objects and advantages of the invention will become apparent from the following description taken in connection with the accompanying drawings and it is to be understood that many changes may be made in the details of construction and arrangement of parts shown and described without departing from the spirit of the invention as set forth in the accompanying claims. I, therefore, do not wish to be limited to the exact arrangement of parts and details of construction shown and described, as the preferred form is given only by way of illustration.

Referring to the drawings:

Fig. 1 is a perspective view of the device embodying the invention and illustrating its use;

Fig. 2 is an enlarged fragmentary view illustrating the related positions of the parts of the device just prior to the setting operation;

Fig. 3 is an end view of the upper jaw portion of the device illustrated in Figs. 1 and 2 and looking in the direction indicated by the arrows 3—3 of Fig. 2;

Fig. 4 is a sectional view taken approximately on line 4—4 of Fig. 2 and looking in the direction indicated by the arrows;

Fig. 5 is a fragmentary sectional view illustrating one position of the upper or spreading jaw member when in final compressed relation with the hollow end of the tube in accordance with the invention;

Figure 7:
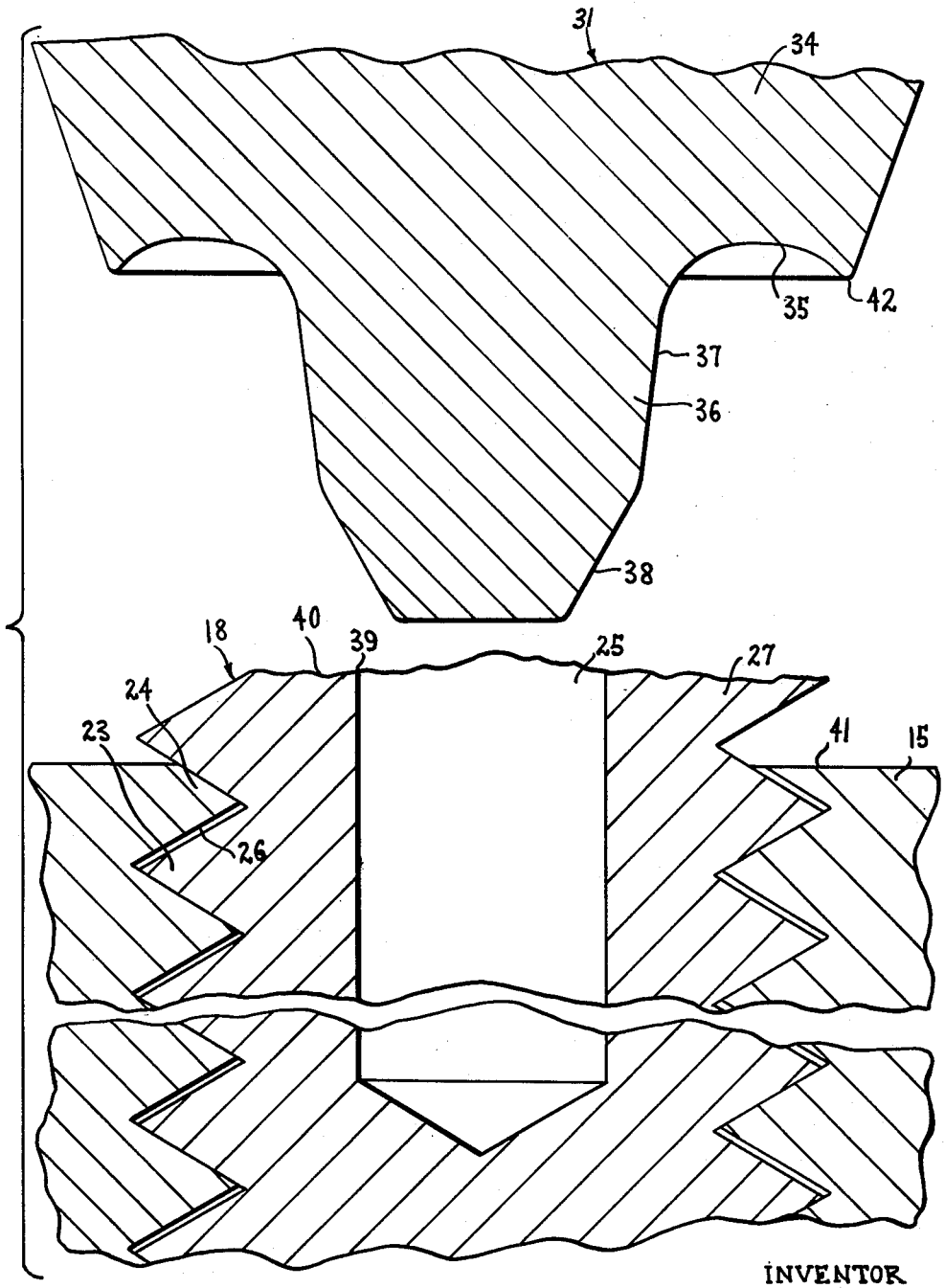

Fig. 6 is a view generally similar to Fig. 5 illustrating the final relation of the upper spreading jaw member with the hollow end of the tube in accordance with a preferred method and use of the device embodying the invention; and Fig. 7 is a greatly exaggerated view illustrating the dimensional relations of the hollowed end of the screw and the screw expanding jaw of the device embodying the invention.

There have been many different arrangements tried in the art for setting screws used in uniting the various parts of an ophthalmic mounting to prevent their backing out and becoming loose during use.

The basic concept of providing a screw with a hollow bore in its threaded end and of providing means adapted to be forced internally of the bore of the screw with a view to expanding the same to prevent the screw from backing out or becoming loose during use is not new in the art. Further, it is not new to provide screws of this nature of an initial length sufficient to accommodate for lenses of different thicknesses with the thought of cutting off the excessive length of the screw and thereafter flaring the exposed end with a view to locking the screw against loosening or backing out. With the first-mentioned prior art arrangement, the screws were initially formed to the fixed finished length desired and, after being tightened into position of use, a tapered member was forced internally of the end of the screw to cause the same to spread to interlock its threads with the threaded bore of the opening receiving the screw. There was no problem of finishing the end surface of the screw such as exists with the present invention.

With the second prior art arrangement, the screws were threaded into final position of use and the opening in the ends thereof, after the screws had been cut to remove excess length, merely functioned as means for maintaining a tool subsequently used in flaring the ends of the screw outwardly in alignment with the screw. The tool simulated a screw driver having a central projection portion fitting loosely within the hollow end of the screw and performed its function by exerting pressure and rotating the tool. With the latter arrangement, no means was provided for supporting the screw adjacent its opposed end and there was no spreading or expanding of the end of the screw by forcing a tapered portion internally of the hollow bore of said screw.

With the above prior art methods, there was no control as to the extent of flaring of the end of the screw or as to the extent of expanding of the screw.

The present invention, therefore, is directed particularly to novel means and method of setting the screws employed in connecting lens straps to rimless lenses wherein care must be exercised while assembling the parts and then subsequently cutting off the excessive length of screw and the final expanding of the end of the screw by forcing a tapered member internally of the hollow bore of the screw so that no strain is directed to the lenses with the danger of breaking the same. It is also extremely important that no sharp protrusions or edges exist after the screw has been set which might be engaged by the hand of the user or by a lens cleaning cloth or handkerchief during the wiping of the lenses and cause injury or introduce difficulty in cleansing the lenses.

Another outstanding feature of the present invention is that great care must be exercised in controlling the extent of expansion of the screw and more particularly where such expansion takes place so as to avoid breakage of lenses and so that, if necessary, the screws may be subsequently removed without damage of the lens strap portion when it is desired to interchange or replace lenses. While the latter result is of extreme importance, it is, of course, of importance that the expanding be sufficient to properly anchor the screw against backing out and working loose during the use of the mounting.

The invention, therefore, is more particularly directed to the provision of novel means and method of assembling the lens straps with the lenses and for anchoring the connection screws properly in position of use while simultaneously controlling the extent of said anchoring and smoothing out and removing undesired sharp protrusions or edges from the ends of the screws such as might result from cutting the excess length from the screw as is necessary prior to setting.

Referring to the drawings and particularly to Fig. 1 there is shown an ophthalmic mounting embodying the conventional bridge member 10, lens supporting arms 11, hinged temples 12, nose pad arrangements 13 and lenses 14. The lens supporting arms 11, in the illustrated embodiment, are provided with lens straps 15 adjacent their temporal and nasal ends which are preferably provided with concave surfaces 16 (Fig. 2) for engagement with the rear surface of the adjacent lens 14. The lenses 14 are provided with transverse bores 17 through which are extended screws 18, the screw heads 19 being seated in washers 20 having concave surfaces 21 engaging the lens surface in opposition to the strap 15. The opposed ends of the screws 18 are threaded into concentric bores 22 in the straps 15.

The bores 17 are dimensioned substantially larger than the screws 18 and have countersunk end portions for providing conventional means for self-alignment of the straps 15 with the lenses 14.

The screws 18 such as used in ophthalmic mountings are necessarily very small and are provided with external threads 23 which are adapted to loosely engage interfitting threads 24 formed in the bores 22 in the straps 15. The screws 18 further may be of sufficient length to extend through lenses 14 of various thicknesses and have a sufficient number of threads 24 so that even with very thin lenses the threads 23 will engage with threads 24 in the straps 15.

Due to the small sizes of the screws 18 and bores 22, it will be understood that it is extremely difficult to form minute threads thereon with the extreme accuracy desired to maintain the parts in assembled relation. Screws many times become loosened due to strain imposed on the mounting when flexing the temples, cleaning the lenses, or the like. Therefore, for these and many other reasons the holding power of the screws does not have the permanency desired.

To overcome this objection and in accordance with the objects of this invention, each of the screws 18 is provided at its threaded end with a longitudinal central hollow bore 25 into which is adapted to be extended an expansion tool (to be described hereinafter) which will expand the bored end of the screw 18 so that the threads 23 will be moved into tight engagement with the threads 24 and frictionally lock the screw 18 in the bore 25 (Figs. 5 and 6). Since the threads 23 and 24 are initially spaced somewhat due to the slackness between the members, as indicated by numeral 26 in Fig. 7, such expansion causes the walls 27 of the bored end of the screw 18 to expand outwardly from the longitudinal axis of the screw and to take up the "slack."

Due to the inherent ductility of the material of the screw the walls 27 will remain unbroken while the threads will remain in continuous frictional engagement throughout their entire surfaces in the area of expansion even when the expander is withdrawn. The frictional engagement provides sufficient locking action between the screw 18 and strap 15 to prevent the screw from becoming loosened during normal usage. However, the screw 18 can be withdrawn in the conventional manner merely by applying a little more pressure than is normally required for the purpose.

It is particularly pointed out that simultaneously with the expanding operation the end of the screw, which is either substantially flush with the adjacent surface of the strap or extended slightly above said surface, is made smooth to eliminate sharp protrusions or edges which might be engaged by the hand of the user or by a lens cleaning cloth or the like.

In accordance with this invention, a screw 18 of a predetermined overall length sufficient to extend through straps and lenses of all thicknesses is used and, with a specially designed tool, can be used to secure the lenses to the straps without imposing any undesirable strain or stress upon the lenses which might result in lens breakage. Since the expansion is limited to only the end threads of the screws in the area of engagement with the straps no stress caused by expansion of the screws will be directed to the lenses.

The tool for performing the expanding and smoothing operations is a novel device modeled along the lines of conventional pliers embodying pivoted handles 28 adapted to be normally retained in spaced relation by spring means not shown. The jaws 29 and 30 will, of course, be spaced in accordance with the relative positions of the handles 27 and 28 and the construction of the plier is such that the jaws maintain a parallel relation with each other and have a straight line movement toward and away from each other.

One of the jaws 29 carries a mandrel 31 of a specific shape and size for expanding the bored end of the screw 18. The mandrel 31 is removably retained in the jaw 29 by means of a threaded end portion 32 secured in a threaded opening provided therefor in the jaw 29. An enlarged portion 33 of the mandrel 31 is provided with a tapered projecting portion 34 which terminates in a concave end surface 35 (Fig. 7) from the center of which extends an integral projection 36. It is important to note here that the peripheral edge of the projection adjacent the juncture with the tapered projecting portion 34 is curved so that the annular end surface 35 encircling the projection 36 is curved throughout substantially as shown in Fig. 7. This is for the purpose of smoothing the sheared ends of the screws 18 as will be described more fully hereinafter.

The projection 36 is provided with a slight inward taper 37 extending for a distance equal to approximately two-thirds of its length and throughout this area is of a diameter larger than the diameter of the bore 25 in the screw 18 but smaller than the outside diameter of the screw shank. The remaining end portion 38 of the projection 36 is tapered inwardly at a sharper angle than the portion 37 and at the point of juncture with portion 37 is of substantially larger diameter than the bore 25 and at the end is of a diameter substantially smaller than the diameter of said bore 25.

Thus, it will be understood that the projection 36 can be made to enter the bore 25 without effect on the screw 18 until the peripheral edge 39 of the bore engages the end portion 38. Then, upon continued forcing of the projection 36 inwardly of the bore 25, the end portion 38 will cause the material of the screw to expand, and continued expansion will take place to a lesser degree as the tapered portion 37 is forced inwardly of the bore 25. This expansion will cause the threads 23 of the screw 18 to intimately frictionally lock with the comating threads 24 of the strap 15, filling in the spaces 26 between the threads as hereinbefore described. Since the projection 36 is of a length equal to about three threads convolutions, the expansion will take place only adjacent the end of the screw which is engaged by the mandrel 31. Thus, the screw 18 will be securely held in place, but can easily be removed in the conventional manner by applying a little additional pressure to that generally necessary for the purpose.

It is particularly pointed out that the screw 18 is of a material which possesses strength and ductility to withstand the expanding process without fracture and yet soft enough so that it can be slightly compressed during the expansion so that the entire length of the projection 31 will enter the bore 25 to such an extent that the annular concave surface 35 will engage the end portion 40 of the screw 18 and, under influence of the pressure exerted upon the device, will smooth the end 40.

In cases where it is desired to finish the screw end portion 40 so as to render it substantially flush with the surface 41 of the strap 15, this can be accomplished by threading the screw 18 into the strap as far as it will go and subsequently shearing off the portion of the screw projecting outwardly of the surface 41 as indicated by dotted lines in Fig. 5. Then, upon using the expansion tool as described the surface of the screw end portion 40 can be smoothed by the annular concave surface 35 simultaneously with the expansion operation. Thus, no rough edges will be exposed for contact by the person or clothing of the wearer of the mounting.

The peripheral edge 42 of the annular surface 35 will, due to the hardness of the mandrel 31, embed itself slightly in the material of the strap 15 to limit the sideways expansion of the material of the screw end portion 40. Thus, the projection 36 is forced inwardly of the bore 25 until the annular surface engages the screw end portion 40 at which time the end portion 40 is not only smoothed but is also forced backwardly, due to the curvature of the surface 35, to cause still greater clamping action of the threads adjacent the end of the screw 18. This will, however, shape the end of the screw to a curve wherein a line drawn substantially parallel with the outer surface 41 of the strap 15 and tangent with the curve will be substantially flush with said surface 41.

In so doing, however, the peripheral edge 42 will form a shallow annular groove in the strap 15 at the point of juncture of the screw end 40 therewith. Therefore, it may be desirable to permit the screw end portion 40 to extend outwardly of the surface 41 in smoothly rounded fashion. To accomplish this the screw 18 is initially inserted to its full extent in the strap 15 and is then withdrawn a desired amount and the end portion 40 subsequently sheared off substantially flush with the strap surface 41. After this has been done the screw 18 is again inserted to its full extent to the position substantially as shown by dotted lines in Fig. 6. At this time the mandrel can be used to simultaneously expand the screw and smooth the surface of the end portion 40 as described. In this case, the peripheral edge 42 of the annular surface 35 will confine the sideways expansion of the end portion 40 of the screw to a very slight overlapping relation with the strap surface 41, the resultant smooth end portion 40 then being of a diameter only slightly larger than the screw, enabling the screw to be easily withdrawn if desired.

It is particularly pointed out that the annular surface 35 not only functions as described to shape the end portion 40 of the screw 18 but also serves to limit the extent to which the projection 36 is permitted to penetrate the bore 25. Thus, the locking action resulting from expanding the screw is confined only to the threads adjacent the end of the screw. This is illustrated clearly in Figs. 5 and 6 wherein it can be seen that only the screw threads adjacent the end of the screw 18 are in closed relation with the threads in the strap 15, while the remaining threads have spaces 26 indicating the loose initial relationship of the parts.

The jaw 30 carries a supporting anvil 43 which, in the effective operation of the tool, is in substantial alignment with the mandrel 31 carried by the jaw 29 (Fig. 2). The anvil 43 is constituted of a supporting member 44 which has an end portion 45 threadedly inserted in an opening in the jaw 30 and projects at right angles from the jaw 30 in a direction toward the mandrel 31. The end of the member 44 is provided with a central projecting portion 46 surrounded by a depressed annular ringlike surface 47. The portion 46 is of a diameter substantially the diameter of the screw head 19 and is provided with a concave surface 48 for reception of the screw head 19 during an expanding operation. The concave surface 48 has a central depression 49 for receiving any accumulation of foreign matter which might otherwise disrupt the relative alignment of the cooperating parts of the device. The washer 20 is located, during the expanding operation, in spaced relation to the annular surface 47, while a tubular retainer 50 fixedly secured in encircling relation to the member 44 has its free end encircling the periphery of the washer 20 as shown in Fig. 2. Thus, the retainer 50 can be used, in initially positioning the tool in engagement with the screw 18, to insure that the screw head 19 is properly supported by the projecting portion 46. This will also insure that the mandrel 31 will properly engage the bore 25 in the opposed end of the screw for performing the expanding operation as described.

It is particularly pointed out that with the device and method described, the screws 18 can be expanded adjacent their threaded ends to lock the threads as described, and that regardless of the manual pressure exerted upon the handles 28 of the tool the mandrel projection 36 will penetrate the screw bores 25 only to a predetermined extent due to the annular surface 35, thereby confining the expansion to the end portion only of the screw 18 and preventing the expansion strain from being directed to the lens 14. Also, due to the fact that the heads ends of the screws 18 are positively aligned for efficient engagement by the anvil 43 attached to the jaw 30 of the tool, this will cause the pressure in performing the expanding operation to be exerted substantially on the longitudinal axes of the screws, thus further aiding in preventing breakage of the lenses 14.

From the foregoing it will be seen that novel means have been provided for more efficiently securing lenses to the frames of ophthalmic mountings in accordance with the objects of this invention, and while the novel features of the invention have been shown and described and are pointed out in the annexed claims, it will be understood that various omissions, substitutions and changes may be made by those skilled in the art without departing from the spirit of the invention, and I, therefore, do not wish to be limited to the exact details shown and described.

I claim:

1. A tool for use in expanding screws used to connect lenses to the lens straps of ophthalmic mountings wherein said screws are provided with a head at one end and a threaded shank at the other end with said threaded end having a central longitudinal bore therein, comprising a plier-like instrument having a pair of jaws pivotally connected to have substantially straight line movement toward and away from one another, one of said jaws having a mandrel attached thereto and shaped to be inserted in the bore of the screw to exand said end, the other of said jaws carrying an anvil, said anvil and mandrel being in substantially coaxial alignment and extending toward one another, said anvil being formed with a centrally disposed projecting portion substantially the diameter of the head of the screw and having a surface curved substantially to the curvature of said screw head, and having a retaining ring surrounding said projection in spaced relation thereto and extending above said projection for encircling said head of the screw to insure positive engagement of the head with said projection and to align the tool so that the mandrel on the opposed jaw will properly engage within said bore for expanding the end of said screw.

2. A tool for use in expanding screws used to connect lenses to the lens straps of ophthalmic mountings wherein said screws are provided with a head at one end and a threaded shank at the other end with said threaded end having a central longitudinal bore therein, comprising a plier-like instrument having a pair of jaws pivotally connected for movement toward and away from one another, one of said jaws having a mandrel attached thereto and the other of said jaws carrying an anvil, said anvil and mandrel being in substantially coaxial alignment and extending toward one another, said mandrel having a rounded end portion of a diameter substantially smaller than the diameter of said bore in said screw to be expanded and having a portion of predetermined taper leading from said rounded end portion and extending sufficiently therefrom to provide a circumferential area having a diameter substantially larger than said bore, said mandrel further having an annular surface of concave shape surrounding said tapered portion adjacent its end of larger diameter and directed toward the end of said mandrel and lying in a plane disposed approximately normal to the axis of the mandrel, said annular surface smoothing and rounding the end of said screw when brought forcibly into engagement therewith as well as limiting the penetration of the projection, said anvil being formed with a projecting portion substantially the diameter of the head of the screw and having a surface curved substantially to the curvature of said screw head, and further having a retaining ring surrounding said projection and extending beyond it for encircling said head to insure positive engagement of the head with said projection and alignment of the mandrel with the bore in the threaded end of the screw.

3. A screw head supporting anvil for use in a tool having a tapered mandrel to be forced within the bore of the threaded end of a screw to expand said end, said anvil having a retaining ring whose inner diameter is slightly greater than that of screw head to be supported, and further having a concave surface disposed centrally of said retaining ring and below the free edge of said ring, said concave surface being spaced from the retaining ring and having the general shape of the surface of the head of the screw to be supported.

4. A screw head supporting anvil for use in a tool having a tapered mandrel to be forced within the bore of the threaded end of a screw to expand said end, said anvil having a retaining ring whose inner diameter is slightly greater than that of screw head to be supported, and further having a concave surface disposed centrally of said retaining ring and below the free edge of said ring, said concave surface having the general shape of the surface of the head of the screw to be supported and being surrounded by a depressed annular-like surface disposed between the outer periphery of said concave surface and the inner wall of the retaining ring.

5. A screw head supporting anvil for use in a tool having a tapered mandrel to be forced within the bore of the threaded end of a screw to expand said end, said anvil having a retaining ring whose inner diameter is slightly greater than that of screw head to be supported, and further having a concave surface disposed centrally of said retaining ring and below the free edge of said ring, said concave surface having the general shape of the surface of the head of the screw to be supported and being surrounded by a depressed annular-like surface located between the periphery of said concave surface and the inner wall of the retaining ring, said concave surface further having a central depression for receiving any accumulation of foreign matter which might disrupt the proper seating of the screw head on said concave surface.

6. A tool for expanding the threaded end of screws used to connect lenses to the supporting structure of ophthalmic mountings wherein portions of the supporting structure have threaded openings interconnecting with the threaded end of said screws and the screws have a bore in their threaded end, said tool comprising a mandrel adapted to fit within and expand said bore in the threaded end of said screws, said mandrel having a concave arcuately-shaped annular end surface of external diametric size greater than that of the threaded end of the screws to receive said end, and a tapered projection extending from the center of said concave annular surface, the axis of said projection being disposed approximately normal to the general plane in which said annular surface is located, said projection having a first portion tapering slightly inwardly from adjacent said annular surface for the greater part of its length, and throughout this part of its length having a diameter smaller than the outside diameter of said threaded end of the screws but greater than the diameter of the bore in said threaded end, the remaining end portion of said projection tapering inwardly at a sharper angle than said first mentioned tapered portion thereof to an end surface of a diametric dimension substantially smaller than the diameter of the bore in said threaded end of the screws, and the inner periphery of said concave arcuately-shaped annular surface substantially merging with the wall of the adjacent tapered portion along an arc whereby it will smooth and round both the inner and outer edges of the annular wall constituting the threaded end of said screw when brought forcibly into engagement therewith, said concave annular surface simultaneously limiting the penetration of the mandrel to the extent of said tapering projection, and said tapering projection having a length less than the length of the opening in the supporting structure of said ophthalmic mountings whereby said expansion of the threaded end of the screws is limited to the end threads thereof and is confined to the thickness of said portion of the supporting structure to avoid strain on the lenses connected by the screws to said structure.

References Cited in the file of this patent

UNITED STATES PATENTS

| Number | Name | Date |
|---|---|---|
| 1,885,986 | Butler | Nov. 1, 1932 |
| 2,036,551 | Stevens | Apr. 7, 1936 |
| 2,199,581 | Uhlemann | May 7, 1940 |
| 2,318,270 | Wagoner | May 4, 1943 |
| 2,332,261 | Rohrbach | Oct. 19, 1943 |